[19] Weidler

[11] 4,267,871
[45] May 19, 1981

[54] TIRE PROTECTOR CHAIN

[76] Inventor: Erhard A. Weidler, Danziger Str. 32, Aalen-Unterkochen, Fed. Rep. of Germany, 7080

[21] Appl. No.: 114,644

[22] Filed: Jan. 23, 1980

[30] Foreign Application Priority Data

Feb. 2, 1979 [CH] Switzerland .................... 1030/79

[51] Int. Cl.³ ............................................. B60C 27/00
[52] U.S. Cl. .............................. 152/189; 24/68 TT; 24/69 TT; 24/299; 152/191; 152/225 R; 248/548; 403/2
[58] Field of Search ............... 152/184, 179, 189, 172, 152/177, 178, 180, 191, 225 R–230; 403/2; 24/68 TT, 68 A, 68 BT, 69 TT, 71 TT, 73 AC; 59/93; 248/548

[56] References Cited
U.S. PATENT DOCUMENTS

| 1,315,969 | 9/1919 | Kienzle | 403/2 X |
| 1,427,500 | 8/1922 | St. John | 403/2 X |
| 1,905,441 | 4/1933 | Cooper et al. | 152/184 |
| 3,414,037 | 12/1968 | Gower | 152/225 R X |
| 3,875,987 | 4/1975 | Nesseth | 152/189 X |
| 4,135,564 | 1/1979 | Müller et al. | 152/189 X |

FOREIGN PATENT DOCUMENTS 2310954 10/1973 Fed. Rep. of Germany .
2651162 5/1978 Fed. Rep. of Germany .

Primary Examiner—William A. Powell
Assistant Examiner—Thomas Bokan
Attorney, Agent, or Firm—Parmelee, Johnson, Bollinger & Bramblett

[57] ABSTRACT

A tire protector chain comprises plate-shaped components (1) which cover the tread of the tire and further comprises on at least one side of the tire a chain net connected to said components (1) by means of connection devices (4;15;24;28;34). The connection devices (4;15;24;28;34) being in the form of overload protection means which under the action of critical external forces free the chain net, or parts thereof, before the breaking strength of the chain links (14) is reached, in such a manner that no fragments of chain links (14) or of the connection devices (4;15;24;28;34) are released.

11 Claims, 5 Drawing Figures

TIRE PROTECTOR CHAIN

The invention relates to a tire protector chain comprising plate-shaped components which cover the tread of the tire that is to be protected, and which at least at their ends nearer the outer side of the tire are provided with connection devices for fastening a chain net covering the side wall of the tire.

In one known tire protector chain of the kind referred to (DE-AS 23 10 954) the connection devices are composed of eyes welded to connectors provided on the lower face of the plate-shaped components. The strength of these eyes is equal to or greater than that of the chain links of the chain net.

In another known tire protector chain (DE-OS 26 51 162) shackles are fastened to the lower face of the plate-shaped components, each shackle having two hook-shaped ends on which links of the chain net can be hung.

It has been found that tires equipped with protector chains of the kind referred to may be subject to explosion-like bursting under extreme conditions, for example when there is a defect in the material or as the result of overloading or fatigue. In the most unfavourable cases the load on the chain net and connection devices is then so great that individual chain links or parts of the connecting devices are fractured, detached from the chain, and thrown off. Not only is the chain net damaged thereby, but there is also a danger that persons will be injured or objects damaged by parts flying off.

The problem underlying the invention is that of so constructing a tire protector chain of the kind first defined above that in the event of the overloading of the chain as the result of explosion-like destruction of the tire any parts of the connecting devices and/or of the chain net which may be broken off are prevented from flying away.

According to the invention this problem is solved in that the connection devices are in the form of overload protection means which under the action of external forces free the chain net, or parts thereof, before the breaking strength of the chain links is reached, in such a manner that no fragments are released.

The tire protector chain according to the invention provides the advantages that under extreme loads of the kind discussed the entire chain net, or at least areas of it, will be detached from the connection devices without the latter or individual chain links being broken in such a manner that fragments which could cause damage are released. The tire protector chain of the invention is in other words provided with predetermined breaking points which enable what occurs through overloading as the result of a tire burst to be brought under control.

The invention is explained more fully below with the aid of a number of embodiments illustrated as examples in the accompanying drawings, in which.

Figure 1:
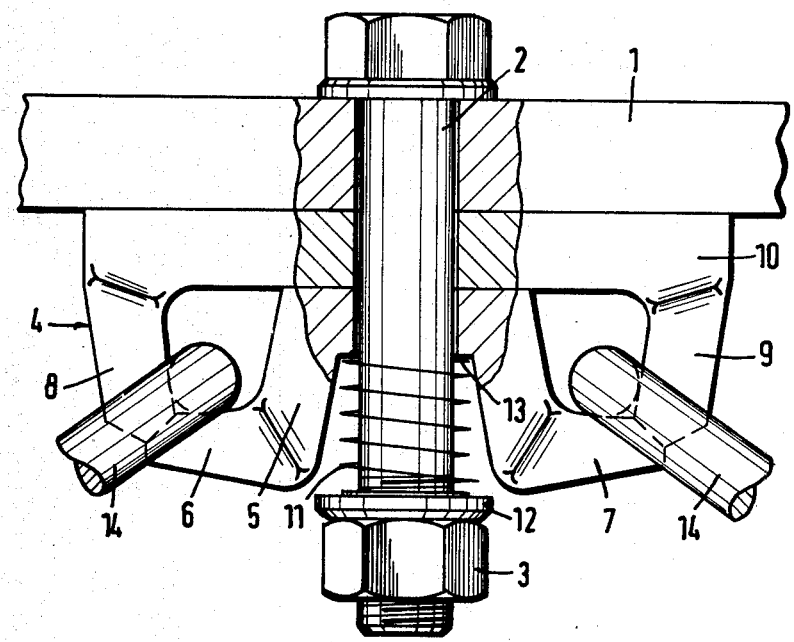
FIG. 1 shows, partly in section, a first connection device.

In FIG. 1, 1 denotes a plate-shaped component of a tire protector chain of the type defined. A connection device given the general reference 4 is fastened on lower face of this component wih the aid of a screw bolt 2 and a nut 3. This connection device 4 includes a shackle 5 having two arms 6 and 7, whose free ends lie against ends of the legs 8 and 9 of a yoke part 10, the ends of the said legs forming stops. A spring 11 surrounding the stem of the bolt 2 is supported at one end with the aid of a washer 12 against the nut 3 and at the other end against a shoulder 13 of the shackle 5. If a tire should burst and extremely high local forces be applied to the chain net, the shackle 5 will be displaced downwards (referring to FIG. 1), overcoming the force of the spring 11. Between the ends of the arms 6 and 7 and of the legs 8 and 9 gaps are formed, which permit disengagement of the links 14 of the chain net which are hung in the connection device 4. At the overload point the chain net will be detached from the covering of the tread without any fractures occurring and without fragments being freed.

Figure 2:
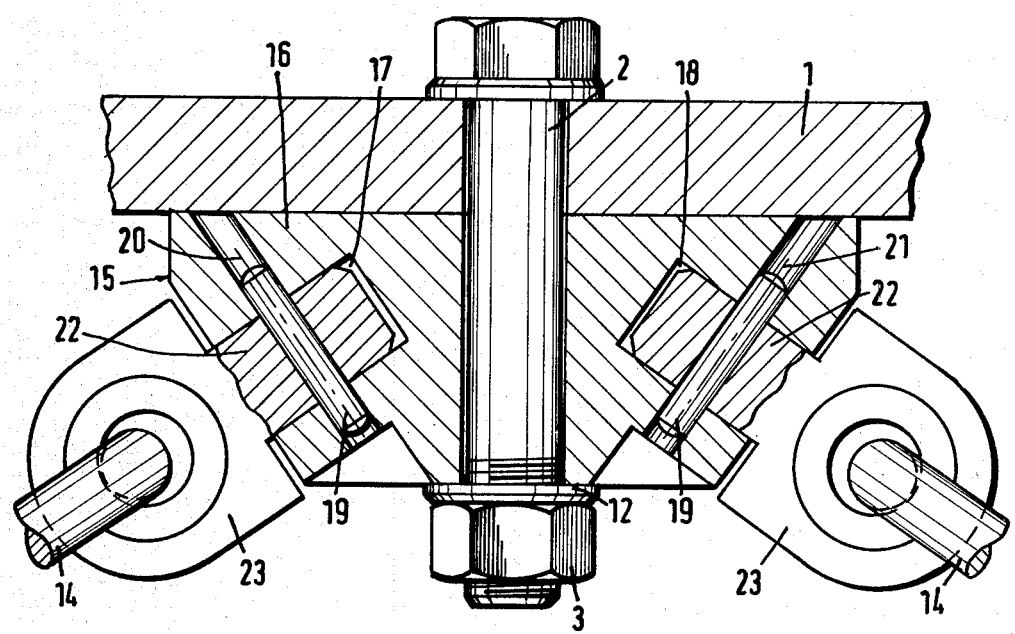
FIG. 2 shows, likewise partly in section, a second connection device.

In FIG. 2 the same references as were used for FIG. 1 are employed for parts corresponding to FIG. 1. FIG. 2 shows a connection device 15 comprising a connection block 16 fastened to the lower face of a component 1 with the aid of a screw bolt and a nut. This connection block 16 is provided with slots 17 and 18, which are bridged over by shear pins 19 mounted in bores 20 and 21. The shear pins 19 engage in bores in projections 22 of connection parts 23, in which in turn links 14 of a chain net protecting the side wall of a tire are hung. In the event of the overloading of the chain net as the result of a tire burst, the shear pins 19 will shear in the region of the overload point, and the chain net will be separated from the connection device 15 without the fracturing of parts which could fly off.

Figure 3:
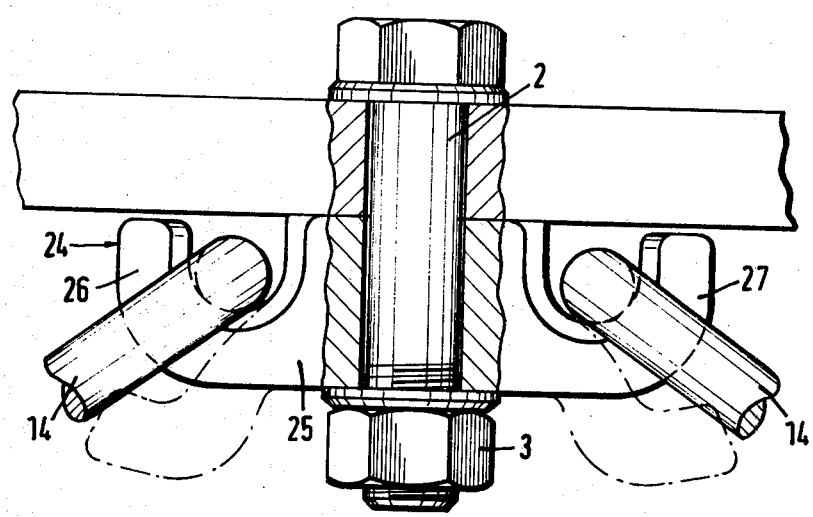
FIG. 3 shows, likewise partly in section, a third connection device.

FIG. 3 shows a connection device 24 provided with a shackle 25 whose ends form connection hooks 26 and 27 for chain links 14. A screw bolt 2 and a nut 3 are here again used for fastening the shackle 25.

In the connection device 24 the connection hooks 26 and 27 have a surface and core hardness of a maximum of 450 HV. It is thereby ensured that when overloaded they will not break off, but will be plastically deformed. If a tire should burst and overload occur, the connection hooks 26,27 will pass out of the position shown in continuous lines in FIG. 3 to the position indicated by dash-dot lines. In this case also no loose parts or fragments are produced.

Figure 4:
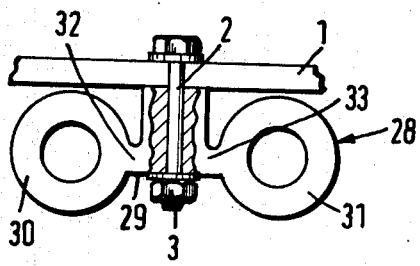
FIG. 4 shows, likewise partly in section, a fourth connection device.

FIG. 4 shows a connection device 28 having a shackle 29 which at its ends is provided with connection eyes 30 and 31. The connection eyes 30,31 are connected by means of predetermined breaking points 32,33 to the remainder of the shackle.

Figure 5:
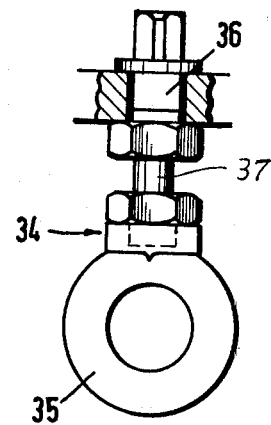
FIG. 5 shows, once again partly in section, a fifth connection device.

Finally, FIG. 5 shows a connection device 34 having a single connection eye 35 fastened to the end of a screw bolt 36 provided with a predetermined breaking point 37. In the last two cases described the connection eyes 30,31,35 remain connected to the chain net even after the fracture and moreover no other parts are freed.

I claim:

1. A tire protector chain comprising plate-shaped components which cover the tread of the tire that is to be protected, and which at least at their ends nearer the outer side of the tire are provided with connection devices for fastening a chain net covering the side wall of the tire, characterized in that the connection devices (4; 15; 24; 28; 34) are in the form of overload protection means which under the action of external forces free the chain net, or parts thereof, before the breaking strength of the chain links (14) is reached, in such a manner that no fragments are released.

2. A chain according to claim 1, characterized in that the connection devices (4) are provided with resilient shackles (5).

3. A chain according to claim 2, characterized in that each of the shackles (5) has two free ends which by means of a central spring (11) are pressed against the ends of the legs (8,9) of a yoke part (10), the ends of the said legs forming stops.

4. A chain according to claim 3, characterized in that the spring (11) surrounds a screw bolt (2) for fastening a connection device (4) to a plate-shaped component (1).

5. A chain according to claim 1, characterized in that the connection devices (15) are provided with shear pins (19) by means of which the chain net is joined to them.

6. A chain according to claim 5, characterized in that the shear pins (19) bridge over slots (17,18) provided in the connection device for receiving chain links or connection parts (23) connected to chain links.

7. A chain according to claim 6, characterized in that the slots (17,18) are each disposed in a connection block (16) fastened by a screw bolt (2) to a plateshaped component (1).

8. A chain according to claim 1, characterized in that the connection devices (24) are provided with shackles (25) having connecting hooks (26,27) which when a determined bending force is reached are plastically deformed in such a manner that they release the chain links (14) held in them.

9. A chain according to claim 8, characterized in that the connection hooks (26,27) have a surface and core hardness of a maximum of 450 HV.

10. A chain according to claim 1, characterized in that connection devices (28;34) are provided with connection eyes (30, 31; 35) and that predetermined breaking points (32,33;37) are provided between the connection eyes (30,31;35) and the remainder of the connection devices (28;34).

11. A chain according to claim 10, characterized in that the connection eyes (35) are fastened to the end of a screw bolt (36) whose stem is provided with the predetermined breaking point (37).

* * * * *